Figure 1:
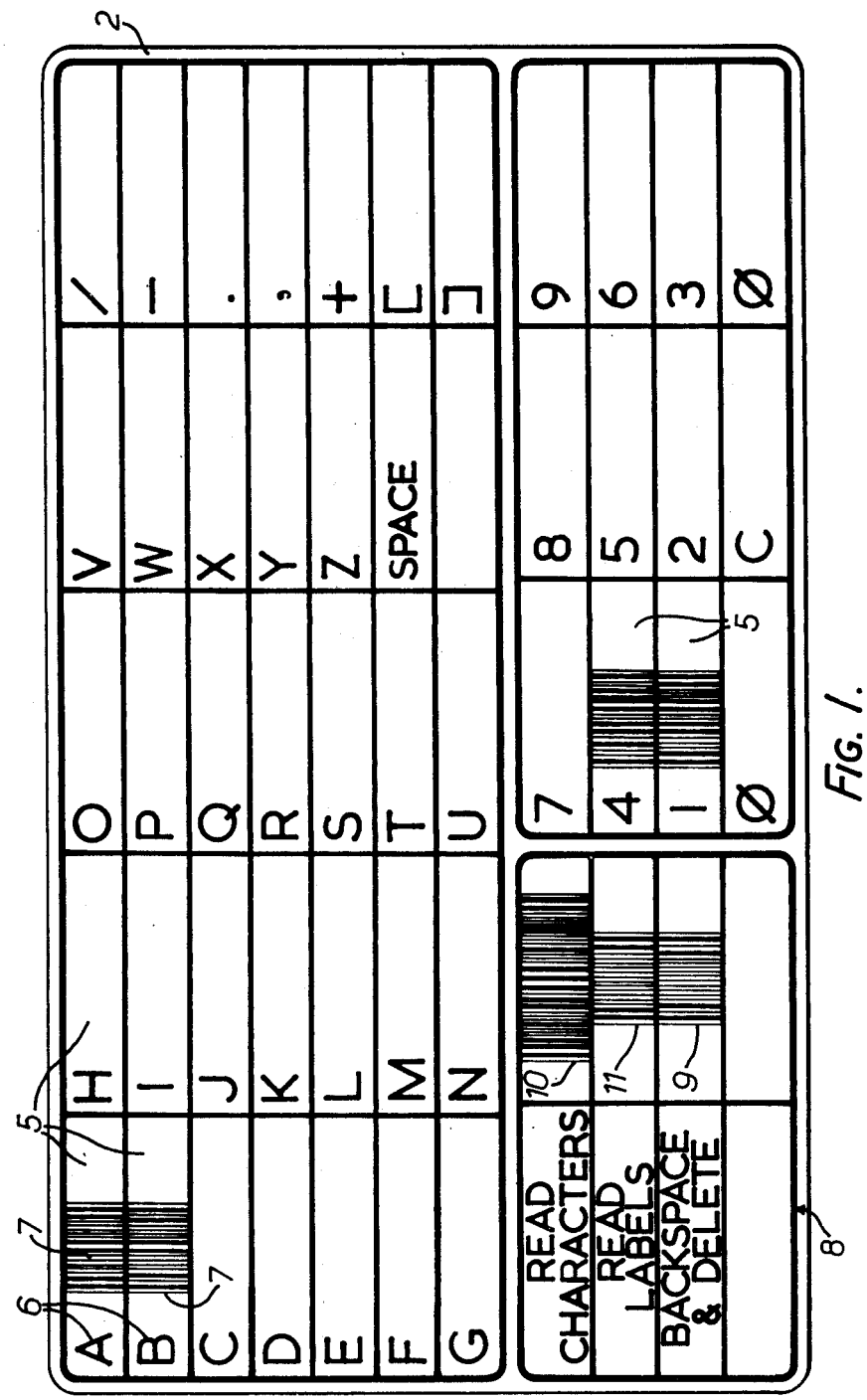

United States Patent [19]
Chesters

[11] 4,196,845
[45] Apr. 8, 1980

[54] BAR-CODED DATA INPUT TERMINALS

[75] Inventor: Ralph C. R. Chesters, Blundsden, Nr. Swindon, England

[73] Assignee: Vickers Limited, London, England

[21] Appl. No.: 895,074

[22] Filed: Apr. 10, 1978

[30] Foreign Application Priority Data

Apr. 15, 1977 [GB] United Kingdom ............... 15845/77

[51] Int. Cl.$^2$ .......................... G06K 7/14; G08C 9/06
[52] U.S. Cl. .................................. 235/462; 235/455; 235/482; 250/555
[58] Field of Search ............... 235/455, 462, 463, 482, 235/472; 250/555; 360/39, 40

[56] References Cited

U.S. PATENT DOCUMENTS

| | | | |
|---|---|---|---|
| 3,699,312 | 10/1972 | Jones et al. | 235/472 |
| 3,792,236 | 2/1974 | Dobras et al. | 235/472 |
| 3,918,029 | 11/1975 | Lemelson | 235/472 |
| 3,978,318 | 8/1976 | Romeo et al. | 235/472 |
| 3,991,299 | 11/1976 | Chadima, Jr. et al. | 235/472 |

FOREIGN PATENT DOCUMENTS 2322227 11/1974 Fed. Rep. of Germany .

OTHER PUBLICATIONS

"Keyboard for Electronic Tablet or Digitizer", IBM Tech. Disclosure Bulletin, vol. 14, No. 3, Aug. 1971, pp. 807-808.

*Primary Examiner*—Daryl W. Cook
*Attorney, Agent, or Firm*—Larson, Taylor and Hinds

[57] ABSTRACT

Signal processing circuitry for a bar-coded data input terminal having a bar-code reading device, such as light pen, for reading bar-coded identity data, from bar-coded identity labels, attached to items to be identified for instance, takes an output signal from the reading device and derives a processed signal in which changes of signal level are cleaner than corresponding level changes in the output signal. The signal processing circuitry employs a high gain operational amplifier to an input of which the output signal is passed through a capacitor. The amplifier has a capacitor and two diodes, with their conduction directions opposite, connected in parallel between the input and the output of the amplifier, from which an amplified signal opposite to the reading device output signal is delivered. A threshold detector receives the amplified signal and provides a processed signal in which signal level changes in dependence upon the amplified signal passing through threshold levels.

11 Claims, 8 Drawing Figures

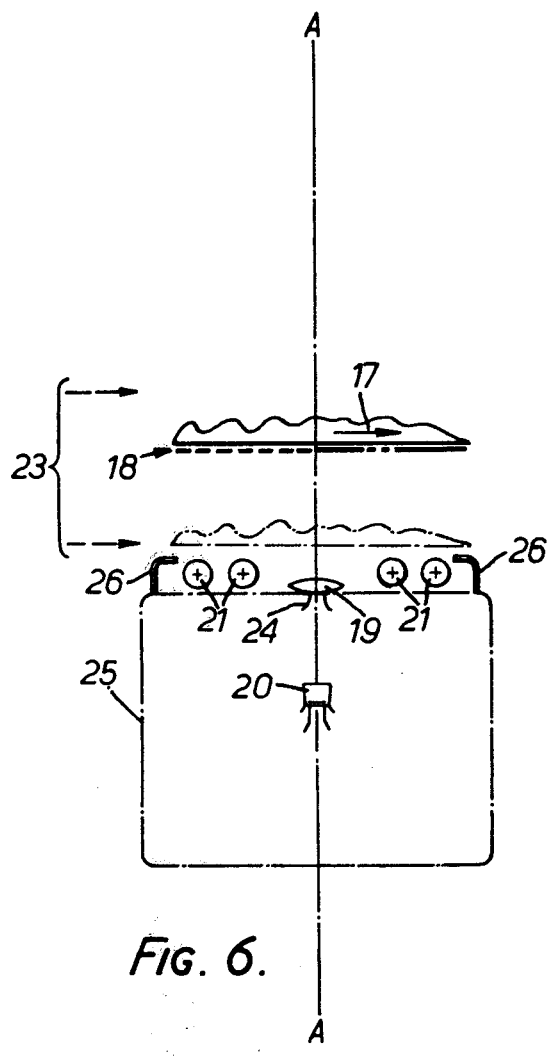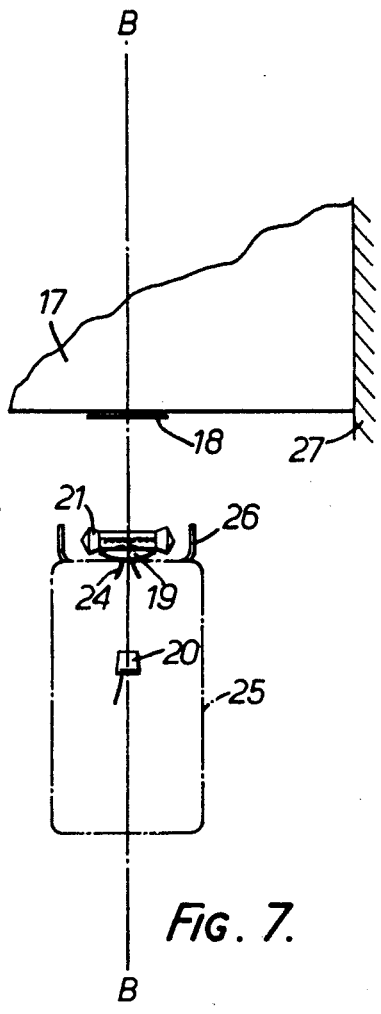
FIG. 6.
FIG. 7.

BAR-CODED DATA INPUT TERMINALS

This invention relates to bar-coded data reading terminals.

Items such as library books, wholesale and retail goods, and components and assemblies in manufacture commonly need to be identified quickly and accurately by computer systems. A technique quite widely used to achieve this identification is the "reading", by hand-held or fixed transducers, for example "light pens", of "bar-code" labels attached to the items. Identity data on such bar-code labels is most commonly coded into the bar pattern in binary form, appearing as a row of alternate dark and light transverse "bars", some of which are wider than others.

An operator terminal for employing this technique for item identification commonly comprises a hand-held bar-code reading device, for example a transducer such as an optical "light pen", a numeric or alphanumeric "typewriter" keyboard having manually operable number, or number and letter, keys, with which to enter additional data such as numbers or quantities of different coded items or the identities of items with spoiled bar-code identity labels, and a numeric or alphanumeric visual data display operable to display entered data.

It can be inconvenient for an operator to manipulate a hand-held bar-code reading device and to operate "typewriter" keyboard keys in the course of an operation. U.S. Pat. No. 3,978,318 discloses a configuration for a hand held bar-code reading device which is such that an operator can hold the reading device and have fingers free to operate "typewriter" keyboard keys.

However, the conventional "typewriter" keyboard and computer interface equipment associated with the keyboard of such a terminal are complex and can account for a significant fraction of the cost of the terminal.

Consider also that in such an operator terminal at which an operator reads "bar-code labels" the keyboard will be actively used by the operator at the terminal, in normal circumstances, for only a relatively small part of the time. The majority of the time will be taken up reading bar-coded labels attached to items to be identified, the operator will generally use the keyboard only in response to the occurrence of an exceptional or infrequent event. The operator may use the keyboard for only, say 5% of the time.

Further, the data to be input via the keyboard in such event is likely to be quite simple, a series of numbers for example, to identify an item with a spoiled bar-code identity label, and it will probably not be a critical requirement that the data be input rapidly. The operator may well be a non-typist and in such a case the speed of input of data will quite likely be the speed of one finger typing.

In this light it will be seen that the expense and complexity of such a conventional "typewriter" keyboard may well be quite unjustifiable when considered in relation to the task which the keyboard is provided to perform at such an operator terminal.

German Offenlegungsschrifts Nos. 2312784 and 2439545 disclose operator terminals for use by waiters in a restaurant. Here, rather than reading bar-code labels attached to items to be identified, there is provided at the terminal, for reading with a hand-held bar-code reading device, a printed plain-text list of the names of items on the menu against each of which names a bar-coded representation of the identity of that item is provided. A waiter can enter information concerning the identity of menu items ordered by a customer into a billing computer by moving the reading device across the bar-coded representations of those items on the list. Bar-coded representations may also be provided for indicating the number of portions of each menu item ordered. "Typewriter" keyboard keys are generally used to enter additional numeric or alphanumeric data and to command computer operations for example. In German Offenlegungsschrift No. 2312784 it is apparently suggested that a bar-code representation indicative of, for example, a command indication that an order for some item has been cancelled can be provided at the terminal in addition to the bar code representations of menu items.

It is also believed that in some other previously proposed systems use has been made of particular bar-code labels, kept at an operator terminal, for use by the operator to advise the system of certain standards circumstances, for example "Assistance needed" or "Storage container full".

In a bar-coded data input terminal embodying this invention signal processing circuitry is employed which processes the output signal from the reading device (e.g., a light pen) into a form which facilitates subsequent digital analysis of the output signal.

Thus, according to one aspect of the present invention, there is provided for use in a bar-coded data input terminal of the kind having data processing circuitry and a reading device for reading an item of bar-coded data into the data processing circuitry, signal processing circuitry for receiving an output signal from the reading device, for deriving from that output signal, for delivery to the data processing circuitry, a processed signal in which changes of signal level are cleaner than corresponding level changes in the said output signal from the reading device, the signal processing circuitry including a high gain operational amplifier having a first input connected to a first capacitor through which the said output signal is delivered to the first input, a second input connected to signal ground potential, and an output from which an amplified signal opposite in phase to the said output signal is delivered; feedback circuitry comprising, connected in parallel between the output and the first input, a second capacitor and first and second diodes with their forward conduction directions opposite to one another; and threshold detection means connected to receive the amplified signal from the said output, and operable to provide the said processed signal in which the signal level changes in dependence upon the said amplified signal passing through threshold levels provided in the threshold detection means. In relation to a bar-coded data reading terminals in which a hand-held bar-code reading device is used to read bar-coded identity data; the provision of data input means whereby a full range of data can be fed into the terminal without the necessity for the provision of an expensive and sophisticated "typewriter" keyboard may be desirable.

When a printed table as discussed hereinbelow is employed as such data input means, in place of a "typewriter" keyboard, all read in data to the data processing circuitry of a bar-coded data input terminal is provided via the bar-code reading device. In this case accurate digital analysis of output signals from the reading device is even more important, since there may be no "typewriter" keyboard through which data may be alternatively read in.

Thus according to another aspect of the present invention, there is provided a bar-coded data input terminal of the kind having data processing circuitry, a hand-held reading device which is moved across an item of bar-coded data to read that data into the data processing circuitry of the terminal, alphanumeric data input means, for feeding alphanumeric character data into the data processing circuitry, comprising a printed table of alphanumeric characters justaposed with respective bar-code representations of those characters which representations can be selectively read by an operator using the hand-held reading device, and an alphanumeric display connected with the data processing circuitry for displaying alphanumeric characters, the data processing circuitry being operable to cause the alphanumeric display to display alphanumeric characters whose bar-code representations are read from the printed table, the input terminal further including signal processing circuitry, for receiving an output signal from the hand-held reading device for deriving from that output signal, for delivery to the data processing circuitry, a processed signal in which changes of signal level are cleaner than corresponding level changes in the said output signal from the reading device, which signal processing circuitry includes a high gain operational amplifier having a first input connected to a first capacitor through which the said output signal is delivered to the first input, a second input connected to signal ground potential, and an output from which an amplified signal opposite in phase to the said output signal is delivered; feedback circuitry comprising, connected in parallel between the output and the first input, a second capacitor and first and second diodes with their forward conduction directions opposite to one another; and threshold detection means connected to receive the amplified signal from the said output, and operable to provide the said processed signal in which the signal level changes in dependence upon the said amplified signal passing through threshold levels provided in the threshold detection means.

It will be appreciated immediately that the use of a printed table or "printed keyboard" as set forth above in an operator terminal, in place of a conventional "typewriter" keyboard, can provide a means for entering data which is, practically speaking, ideally adapted to the operational requirements experienced at such operator terminals, without wasted or redundant sophistication.

A conventional typewriter keyboard might cost something in the range from £200 to £400, a "printed keyboard" embodying the present invention will cost, it is envisaged, only about £2.

The "printed keyboard" can be provided with instruction or advisory command, or "function" bar codes in juxtaposition to plain-text function titles, in addition to the full range of alphanumeric symbol indicating bar codes.

An article to be found in IBM Technical Disclosure Bulletin Vol. 14, No. 3, August 1971, p.p. 807–808, entitled "Keyboard for electronic tablet or digitizer", by R. N. Wolfe, may be of interest for comparison and contrast with the present invention.

Figure 2:
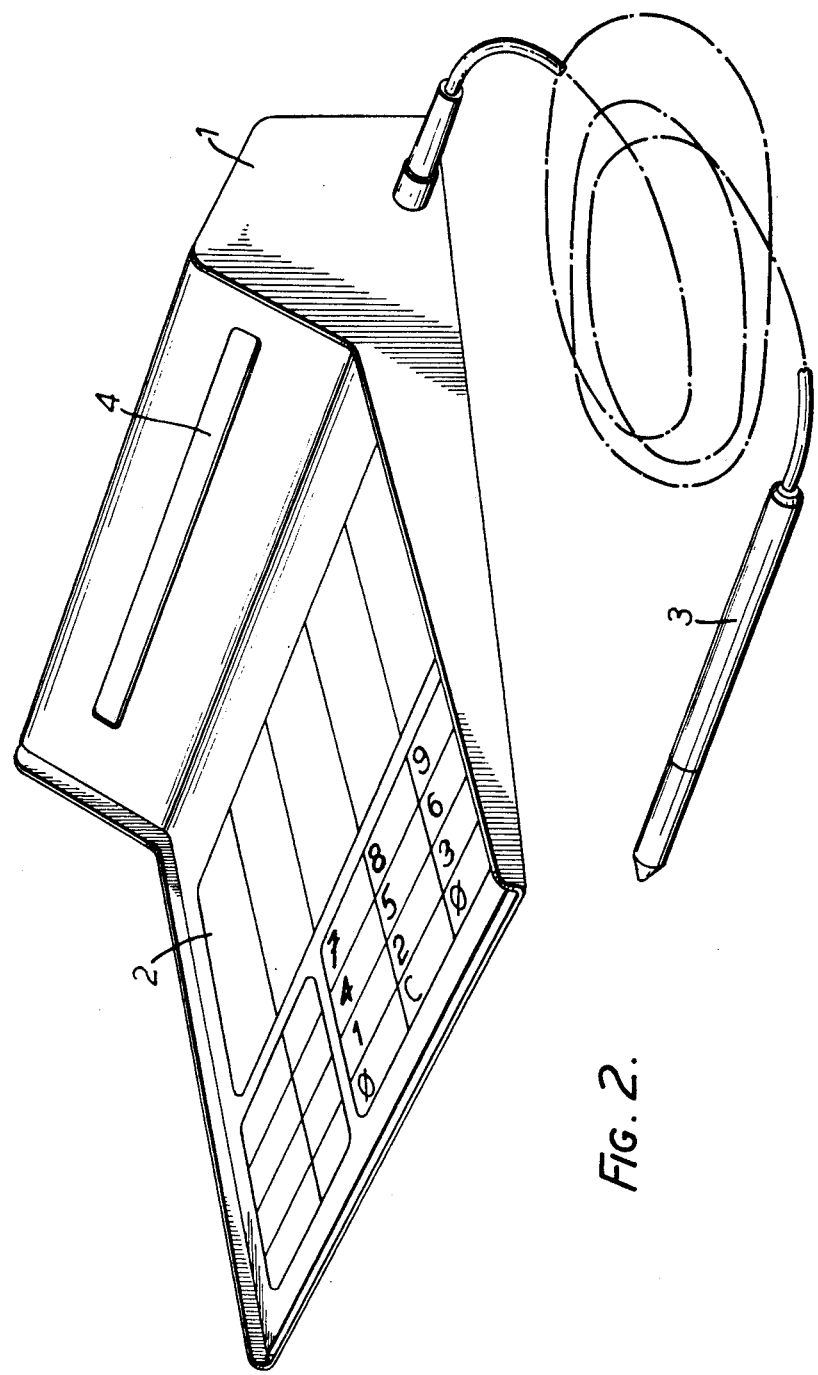
Figure 3:
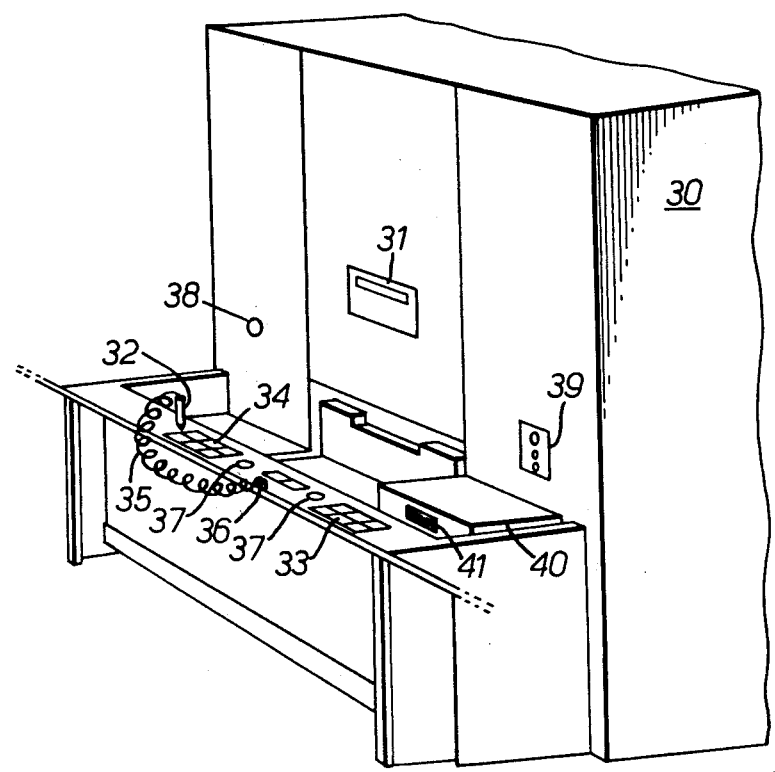
Figure 3:
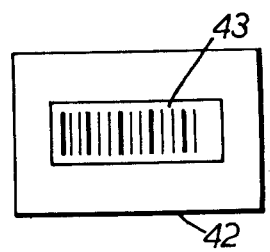
Figure 4:
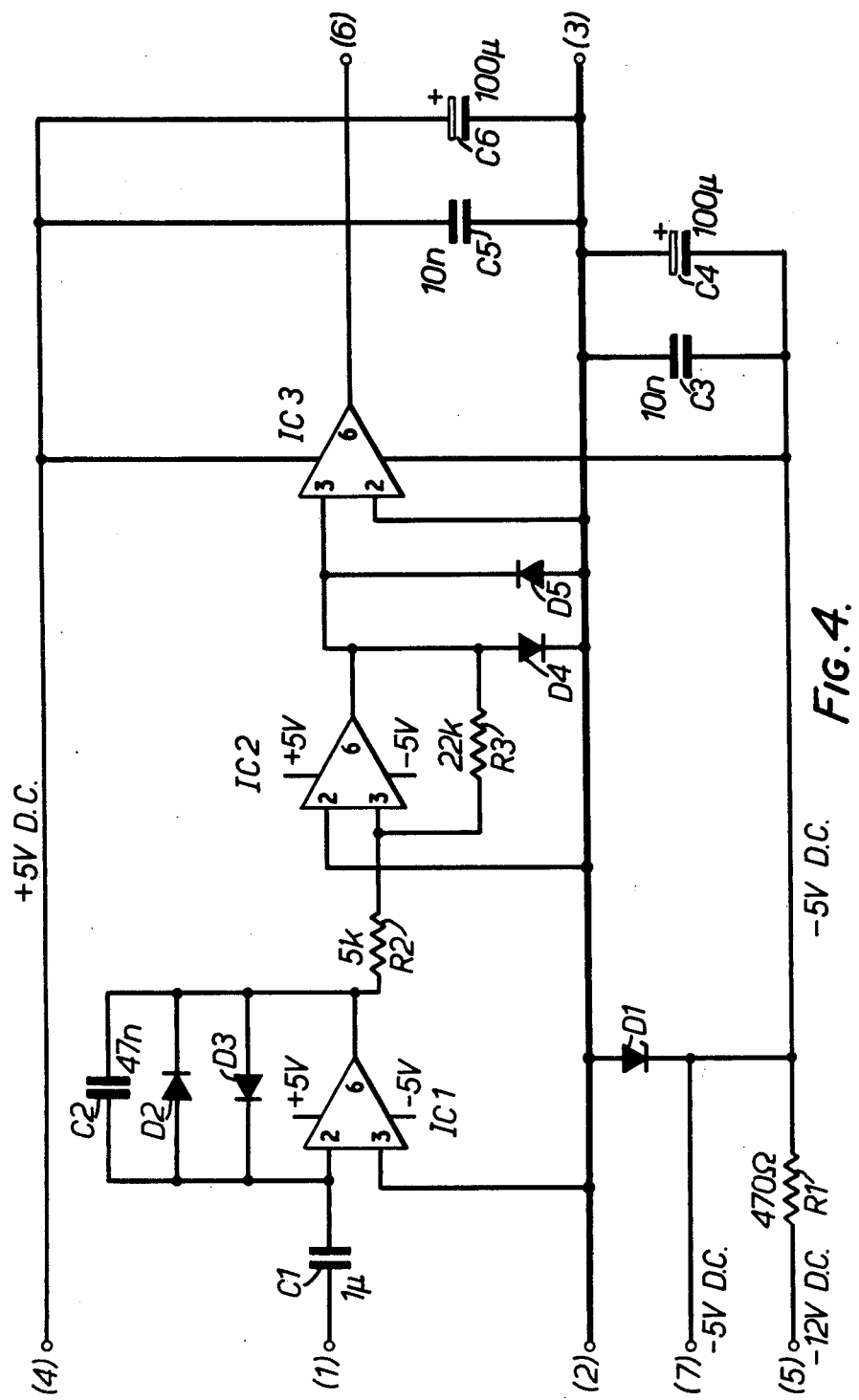
Figure 5:
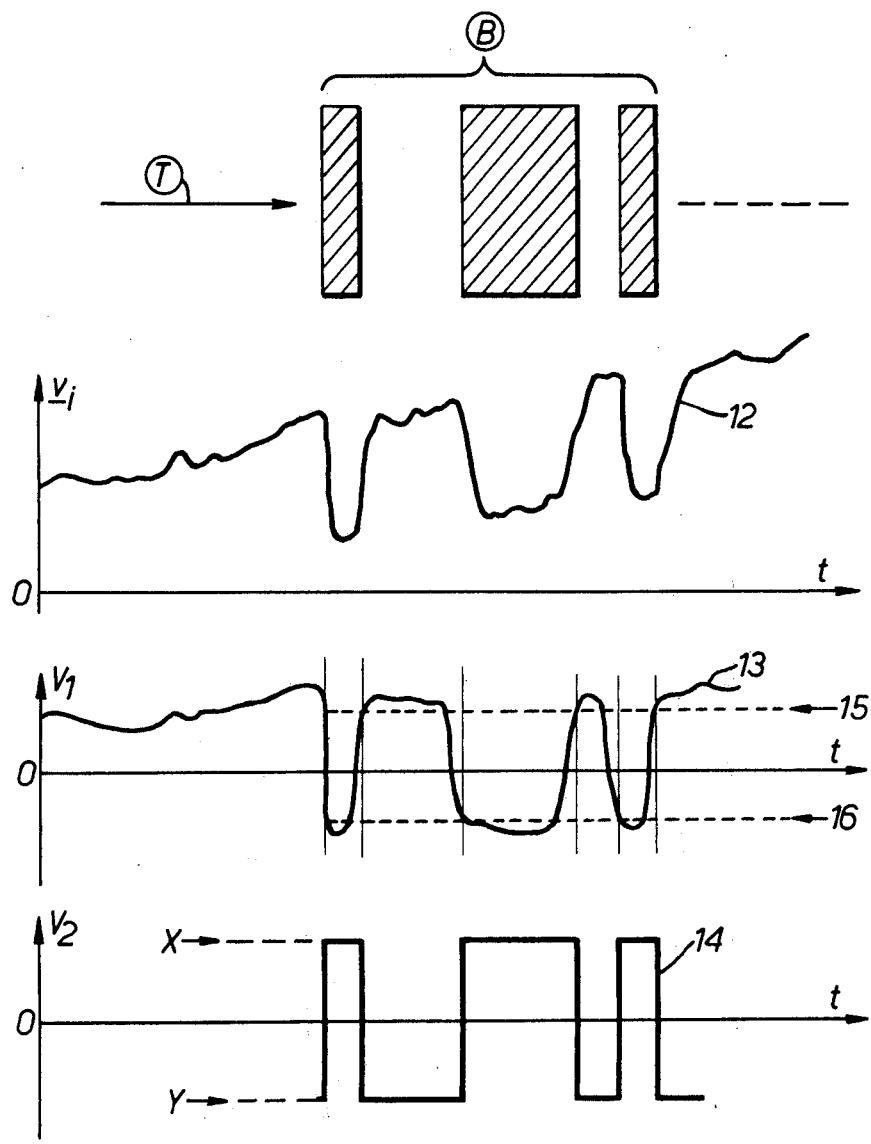
Figure 8:
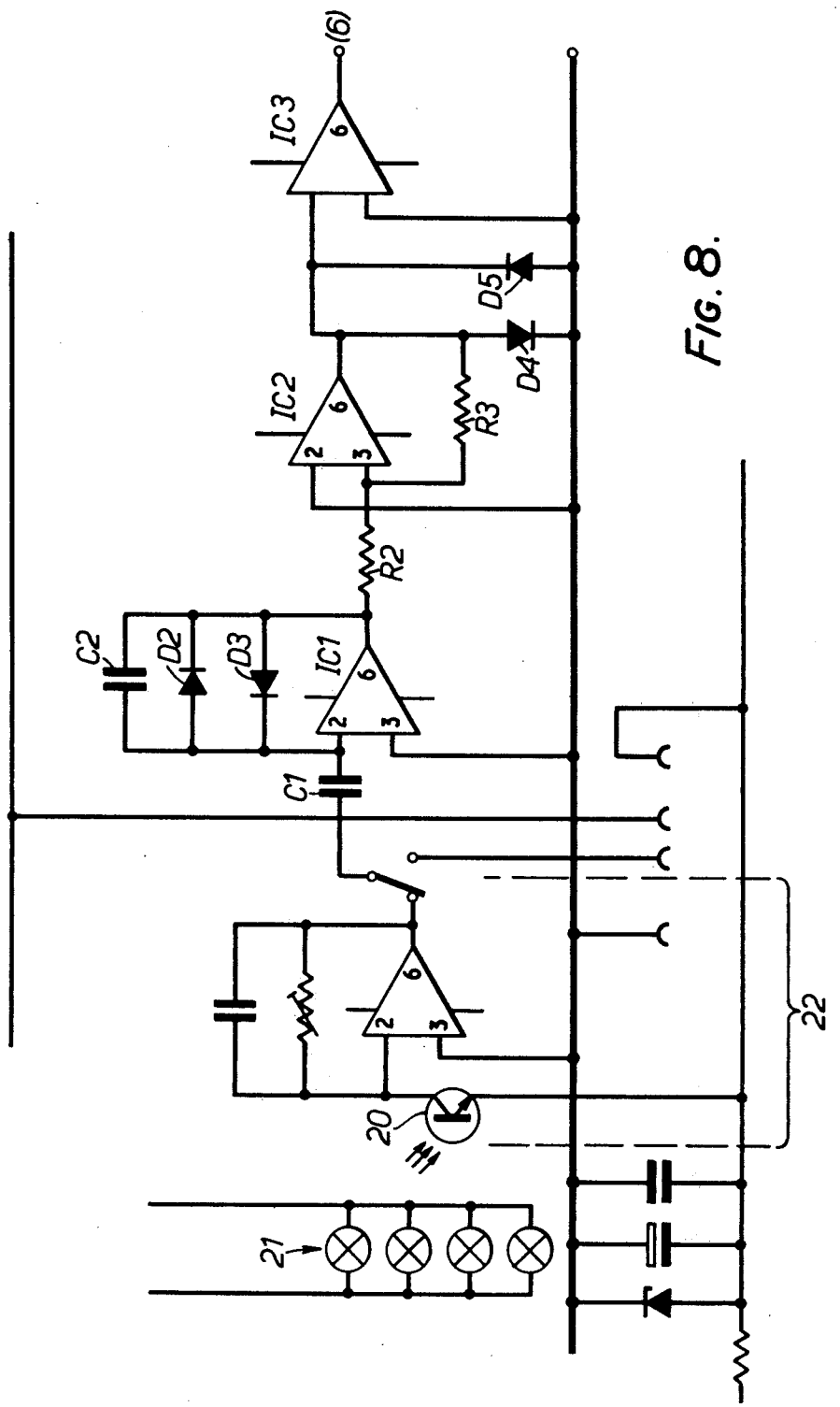

Reference will now be made, by way of example, to the accompanying diagrammatic drawings, in which:

FIG. 1 shows a plan view illustrating the nature of a printed table for use in bar-coded data input terminals embodying the present invention, FIG. 2 shows a perspective view of a bar-coded data input terminal embodying the present invention employing a printed table as shown in FIG. 1, FIG. 3 shows a perspective view of another bar coded data input terminal embodying the present invention, FIG. 4 is an electrical circuit diagram of signal processing circuitry embodying the present invention, FIG. 5 shows waveform diagrams, FIG. 6 illustrates in vertical section the use of a fixed bar-code reading transducer, FIG. 7 shows a view in a plane corresponding to the line A—A of FIG. 6, and FIG. 8 shows signal processing circuitry embodying the present invention used with the transducer of FIGS. 6 and 7.

FIG. 1 shows the layout of one example of the "printed keyboard" 2 which is employed in a bar-coded data input terminal embodying the present invention. The keyboard is made of paper, with a plastic protective layer hot-laminated over it. The keyboard is flat and can be bonded to a metal face panel of an operator terminal housing.

Each "keyboard character" 5 comprises a small area clearly outlined and enclosing an individual alphanumeric character 6 which may be printed in a coloured ink, juxtaposed with a short bar-code 7, representing the alphanumeric character concerned, printed in black. In the example shown, standard binary "7-bit ASCII" data bar-code patterns are given for the alphanumeric characters A, B, 4 and 1, the bar-codes for the other characters being omitted from the drawing for the sake of simplicity.

The alphanumeric characters needed can be laid out on the "keyboard" in many ways. The example illustrated differs from a "typewriter" layout, being possibly easier for non-typist personnel to use. Message/function code labels appropriate to a given system can be printed, in addition to the alphanumeric "keyboard characters" on areas of the "keyboard" as indicated in enclosed zone 8.

In use, an operator at an operator terminal employing such a "printed keyboard" "reads" a desired sequence of characters to be entered from the "keyboard" by stroking a hand-held light pen (see below) over each selected character bar-code in turn, instead of pressing keys as with a regular "typewriter" keyboard. Thereby any necessity for a regular "typewriter" keyboard can be avoided.

FIG. 2 shows an operator terminal 1 with a "printed keyboard" 2 mounted conveniently on its front top face. A conventional "light pen" 3 and display panel 4, in this example providing a 40 character full alphanumeric display, can also be seen. The terminal employs the signal inputs produced by stroking light pen 3 over the selected character bar-codes to display the entered characters in the panel 4, of FIG. 1, for the operator to check. That is to say, selected characters are "echoed" in the display panel 4. On the printed keyboard a "function" code 9, designated by the function title "back space and delete", causes the last character read to be deleted and allows errors to be corrected. Invalid (e.g. incomplete) bar-code readings can cause a long acoustic bleep, advising "read character again", as is conventional in bar-coded label readers.

Transition from reading normal (data length) barcode labels to conveniently short single character codes on the "printed keyboard", and back again, can be made either by automatic bar-code data analysis, in the system, or by reading two special function codes 10 and 11 provided on the "printed keyboard", alternately, designated by plain-text function titles "READ CHARACTERS" and "READ LABELS" respectively. The latter, while apparently more cumbersome, is sometimes found to be the mode of operation that is easiest for the operator.

For some applications, for example at an operator work station on a conveyor belt carrying a mini-stacker store of items identified by means of bar-coded identity labels it may be convenient, in an operator terminal provided at the work station, for the terminal display to be mounted remotely from the printed table carrying the keyboard characters, for ergonomic reasons.

It may be also be convenient to provide two differently located printed tables for use alternatively by an operator at such a work station, coupled to a single display.

FIG. 3 shows an operator terminal 30 embodying the present invention. The terminal 30 has a 40 character full alphanumeric display 31, for example a plasma display, a light pen 32, and first and second "printed keyboards" 33 and 34 each the same as printed keyboard 2 of FIG. 1. The light pen 32 is on one end of an extension cable 35, the other end of which is plugged into a central mounting socket 36. Two light pen holders 37 are provided in which the pen can be placed when it is not being used by an operator. Other items shown in FIG. 3 are a left hand safety "stop" button 38, an on/off switch and safety stop button panel 39, and a bin 40 for holding items to be identified, the bin itself being identified by a bar-code label 41.

FIG. 3 thus illustrates a split configuration for an operator terminal, the display 31 and the printed keyboards 33 and 34 are separated from one another. This configuration allows an operator to view the display and to use a printed keyboard from a variety of positions, for example standing and sitting.

In FIG. 3 there is shown, by way of example, in item identity label 42, bearing bar-coded identity data 42 which is normally attached to the item to be identified, to be read by the operator with the light pen 32.

It is possible, using printed tables, to provide only a relatively small processor in the system which can handle signals coming from a plurality of operator terminals.

The "printed keyboard" is not likely to be spoiled by dust and dirt, and can be wiped over. No special maintenance is needed, and even total replacement is extremely cheap. Being an intrinsically totally sealed and crevice-free device, the "printed keyboard" can be particularly suitable for hospital and food industry use. In addition, "Special" printed keyboards can economically be made for particular user systems.

Although "printed keyboard" maximum data entry rate is generaly slower than that with normal finger touch keyboards, for many terminal jobs no significant loss of efficiency is found when entering only the small amounts of additional necessary data that are not included in item bar-code labels being read at the terminal.

The use of operator terminals embodying the present invention is thus well suited to a system in which keyboard data entry is not the primary duty of the operators. Individual workers in a work area are the terminal operators, and the present invention facilitates the provision of many inexpensive terminals distributed throughout the work area, so that each worker has ready access to a terminal, thereby avoiding job disturbance. In the overall system there may be provided a few centralised "typewriter" keyboard-VDU terminals for use when large amounts of data are to be read into or out of the system.

It will be appreciated that although the alphanumeric characters on the printed keyboard of FIG. 1 comprise Latin alphabet characters, the characters may be those of other alphabets, for example Cyrillic, as appropriate.

Bar-coded data systems most commonly employ optical transducers, to "read" visibly printed bar-codes and this is preferred for the present invention, but systems using bar-codes made up of magnetically, conductively or otherwise contrasting patterns can be used. A handheld transducer "light pen" or "wand" is commonly used to read the bar-codes by stroking it across the sequence of bars, in contact with the pattern. For reading the identities of items on a moving conveyor, for example, when such contact is not possible a fixed transducer can additionally be employed.

In each case, the electrical output of the transducer (light pen 3 for example) generally varies in level, not only with the wanted (e.g. light/dark bar-code) data but also with overall background or illumination level and dirt/print irregularities. To facilitate "digital" analysis of the waveform, it should be processed into a shape as similar as possible to the ideal black/white code pattern.

FIG. 4 shows a preferred circuit for effecting such processing, by rejecting lesser perturbations, due to dirt and printing irregularities, and adapting continuously to changes in background level and to the average signal levels found in different transducer examples.

IC1 and IC2 are high gain operational amplifiers with output terminals 6, and differential input terminals 2 (opposite in phase to the output at 6) and 3 (same phase as output).

IC1 operates basically as a wide band negative feedback linear amplifier, with impedance components C1 and C2, receiving the light pen output $v_i$ at terminal (1). Terminal (2) is the signal ground terminal, and terminals (4), (5) and (7) are D.C. supply terminals.

The gain of the IC1 stage is $\omega C1/\omega C2 =$ simply $C1/C2$, and a useful gain of about 20 times is obtained in the illustrated case.

This arrangement is unusual in that capacitor, rather than resistor, impedance components are used. Such capacitor use permits the circuit to achieve continuous adaptation to changing average signal levels.

Similar silicon diodes D2 and D3 complete the feedback network of IC1. For output level changes near zero, feedback current charges C2. For larger positive and negative output levels, one or other diode passes feedback current, limiting the output terminal level excursions.

In response to a steadily changing input level $v_i$ the feedback current is constant at $C1 \times dv_i/dt$. The output level amplitude is approximately equal to the logarithm of this feedback current, in accordance with the silicon diode forward conduction characteristic.

FIG. 5 shows at the top an arrow T denoting the movement of the light pen, or other bar-code reading device, across a bar-code B. The resulting transducer output $v_i$ is shown by waveform 12, while the outputs from IC1 (V1) and IC2 (V2) are shown by waveforms 13 and 14 respectively.

The circuit of IC1 responds to the typical input from the transducer by substantially changing its output level about zero each time the waveform slope changes for a significant period—typically when approaching and leaving a code "bar". This begins to form the wanted bar-like output waveform. Differences in transducer average output levels simply cause steady biasses across C1—they do not affect the output terminal level—now symmetrical about zero.

Typical changes in average transducer level occur much more slowly than bar entry/exit wave changes, and have practically insignificant effect on the output waveform 13 of IC1. The smaller, unwanted, perturbations in transducer output appear, generally attenuated, superimposed on the more regular output of IC1.

IC2 has a positive feedback path arranged round it by R3 (FIG. 3). With R2 as its input resistor, a Schmitt trigger or hysteresis non-linear amplifier is formed. Its output is limited, by diodes D4 and D5 (similar to D2 and D3), to levels above and below zero that are substantially determined by the positive feedback current in R3 and R2 and the diode forward characteristic.

The IC2 stage accordingly responds to input level changes above and below symmetrical hysteresis levels 15 and 16 (about ±400 mV) with sharp output level changes. The resulting clean waveform 14 is the desired bar-code like shape, ready for later digital pattern analysis by data processing circuitry (not shown) connected to output terminal (6) of FIG. 3.

The hysteretic stage (IC2) serves to disregard and hence filter out the unwanted smaller transducer perturbations, and form a clean waveform immediately suitable for time measurement and digital code analysis. For near-optimum achievement of the filtering purpose, the hysteresis voltage levels are chosen to lie somewhat inside the typical normal positive and negative excursions of IC1 output in response to code-bar transitions.

It will be noted that the similar diode pairs D2/D3 and D4/D5 can readily be arranged to enjoy similar temperature conditions, thereby affording automatic compensation for the effects of the temperature changes.

The initial output state X or Y (high or low) of the hysteretic stage IC2 is uncertain as the transducer approaches the first 'bar' in the coded data. The practical effect of this may be to "gain" or "lose" code-bar at the beginning of each reading. This can be allowed for in the subsequent data analysis. Typically bar-codes can be "read" from either end and the end-most "bars" are not data. Even if a "first" bar is "lost", the code pattern read will include a "last" end bar and the whole code can be analysed correctly as though the transducer had started its reading from the other end. If such an analysis procedure is undesirable in a given system, the hysteretic stage can be replaced by a simple threshold detector. This removes the initial output state uncertainty, but reduces the circuit's rejection of small transducer perturbations.

A two-stage circuit such as that employing IC1 and IC2 in FIG. 4 can be provided at desirably low cost, and imposes no initial setting-up requirement. The additional stage IC3 may be of value in some circumstances, but may be dispensed with in other cases.

Such a circuit can also be used with a fixed transducer as mentioned above. The latter can take the very simple form of a lens, photosensor, and light source, as shown in FIGS. 6 and 7, and can be used with a single linear preamplifier stage as indicated in FIG. 8.

As indicated in FIGS. 6 and 7, items 17 with bar-code labels 18 move past the common optical axis of a double-convex lens 19 and a light-detecting photo-transistor 20 provided with a flat glass window. Each label 18 in turn is illuminated, as it passes the optical axis, by four festoon lamps 21. As dark and light code-bars, on self-adhesive parcel labels 18, are imaged in turn on the detector 20, the output signal level from preamplifier 22 (FIG. 8) follows the imaged light intensity changes. This signal level provides the input, in FIG. 8, to processing circuitry the same as that in FIG. 3.

With further reference to FIGS. 6 and 7, the label 18 to be read should be within a reading zone 23 that is typically 50 mm. high. The focal length of lens 19 is 15 mm., and its distance from the detector 20 is 40 mm. A stop 24, of 2.5 mm. diameter, is provided at the detector (inward) side of the lens 19. Two of the lamps 21 are spaced 25 mm. to either side of the optical axis of the lens 19, and the other two are spaced 40 mm. therefrom.

The reader is housed in a light sealed box 25 having all electronics connectors mounted in or on it and carrying local steel lamp guards 26 (more protective structure being provided on conveyor 27).

I claim:

1. For use in a bar-coded data input terminal of the kind having data processing circuitry and a reading device for reading an item of bar-coded data into the data processing circuitry, signal processing circuitry for receiving an output signal from the reading device, for deriving from that output signal, for delivery to the data processing circuitry, a processed signal in which changes of signal level are cleaner than corresponding level changes in the said output signal from the reading device, the signal processing circuitry including a high gain operational amplifier having a first input connected to a first capacitor through which the said output signal is delivered to the first input, a second input connected to signal ground potential, and an output from which an amplified signal opposite in phase to the said output signal is delivered; feedback circuitry comprising, connected in parallel between the output and the first input, a second capacitor and first and second diodes with their forward conduction directions opposite to one another; and threshold detection means connected to receive the amplified signal from the said output, and operable to provide the said processed signal in which the signal level changes in dependence upon the said amplified signal passing through threshold levels provided in the threshold detection means.

2. Signal processing circuitry as claimed in claim 1, wherein the threshold detection means comprise an hysteretic non-linear amplifier stage defining as threshold levels first and second hysteresis voltage levels.

3. A bar-coded data input terminal of the kind having data processing circuitry, a hand-held reading device which is moved across an item of bar-coded data to read that data into the data processing circuitry of the terminal, alphanumeric data input means, for feeding alphanumeric character data into the data processing circuitry, comprising a printed table of alphanumeric characters juxtaposed with respective bar-code representations of those characters which representations can be selectively read by an operator using the hand-held reading device, and an alphanumeric display connected with the data processing circuitry for displaying alphanumeric characters, the data processing circuitry being operable to cause the alphanumeric display to display alphanumeric characters whose bar-code representations are read from the printed table, the input terminal further including signal processing circuitry, for receiving an output signal from the hand-held reading device for deriving from that output signal, for delivery to the data processing circuitry, a processed signal in which changes of signal level are cleaner than corresponding level changes in the said output signal from the reading device, which signal processing circuitry includes a high gain operational amplifier having a first input connected to a first capacitor through which the said output signal is delivered to the first input, a second input connected to signal ground potential, and an output from which an amplified signal opposite in phase to the said output signal is delivered; feedback circuitry comprising, connected in parallel between the output and the first input, a second capacitor and first and second diodes with their forward conduction directions opposite to one another; and threshold detection means connected to receive the amplified signal from the said output, and operable to provide the said processed signal in which the signal level changes in dependence upon the said amplified signal passing through threshold levels provided in the threshold detection means.

4. A bar-coded data input terminal as claimed in claim 3, including signal processing circuitry wherein the threshold detection means comprise an hysteretic non-linear amplifier stage defining as threshold levels first and second hysteresis voltage levels.

5. A bar-coded data input terminal as claimed in claim 3, wherein the printed table further comprises plain-text function titles juxtaposed with respective bar-code representations of the functions concerned which representations can be read selectively by an operator using the hand-held reading device to cause the data processing circuitry to perform the functions concerned.

6. A bar-coded data input terminal as claimed in claim 5, wherein a first function having a bar-code representation on the printed table is a "back space and delete" function, provided to enable correction of an alphanumeric character erroneously read into the processing circuitry.

7. A bar-coded data input terminal as claimed in claim 6, wherein second and third functions having respective bar-code representations on the printed table are "read characters" and "read labels" functions, provided respectively for indicating to the data processing circuitry, when the respective bar-code representations of those functions are read with the reading device, that a next to be read bar-code representation is an alphanumeric character bar-code from the printed table and that a next to be read bar-code representation is an item identification bar-code provided on a bar-coded item identity label.

8. A bar-coded data input terminal, as claimed in claim 3, wherein the alphanumeric display is a known per se full alphanumeric display of at least 40 characters.

9. A bar-coded data input terminal as claimed in claim 8, wherein the printed table is mounted remotely from the alphanumeric display.

10. A bar-coded data input terminal as claimed in claim 3, wherein the reading device is a known per se optical light pen reading device, and in that the bar-code representations on the printed table comprise respective bar patterns each appearing as a row of alternate dark and light transverse bars, some of which are wider than others.

11. A bar-coded data input terminal as claimed in claim 10, wherein the respective bar-coded representations of the alphanumeric characters on the printed table are known per se standard binary 7-bit ASCII bar-coded patterns.

* * * * *